May 18, 1954  A. L. GRISÉ ET AL  2,678,624
FLOW INDICATING MEANS FOR LIQUID DISPENSING APPARATUS
Filed Sept. 25, 1952  3 Sheets-Sheet 1
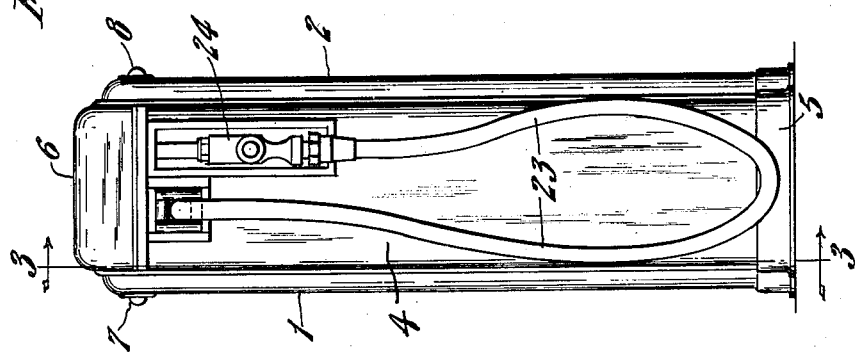
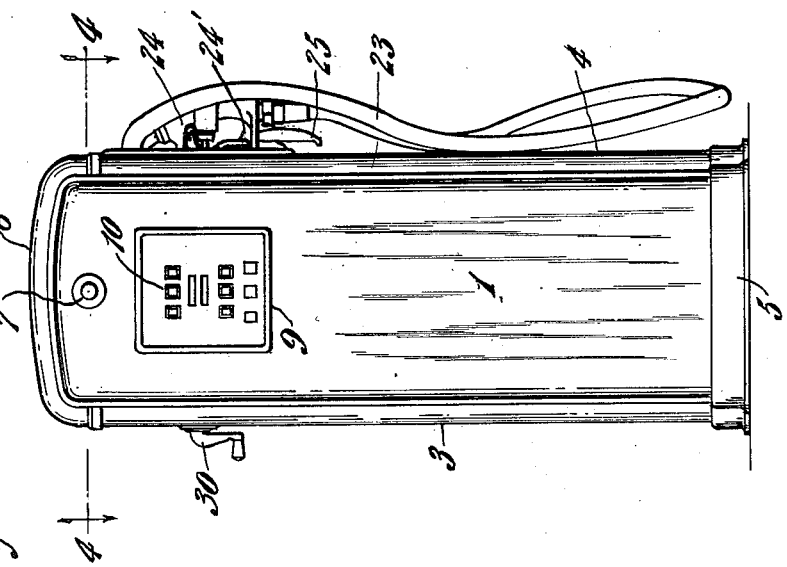
INVENTORS,
Alfred L. Grisé and
John J. Pacey,
BY Chapin & Neal
ATTORNEYS

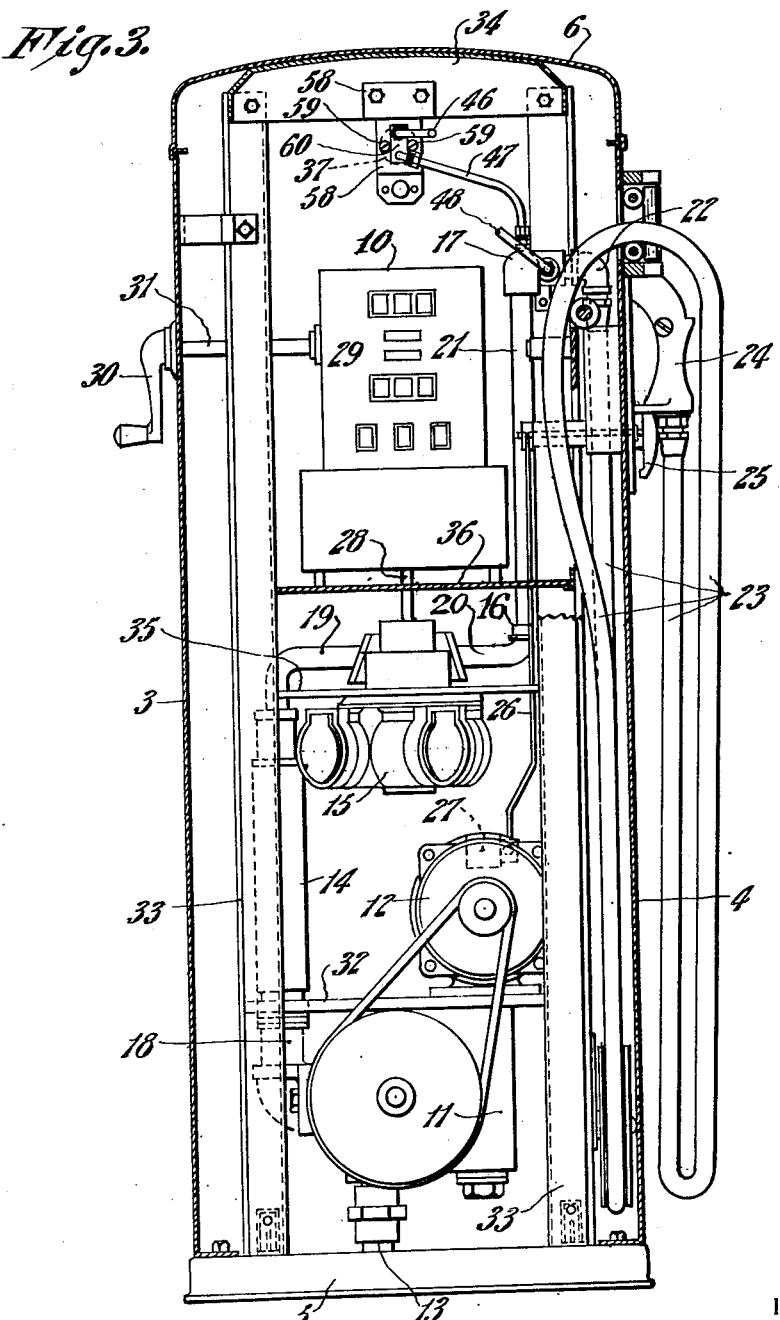

May 18, 1954  A. L. GRISÉ ET AL  2,678,624
FLOW INDICATING MEANS FOR LIQUID DISPENSING APPARATUS
Filed Sept. 25, 1952  3 Sheets-Sheet 3
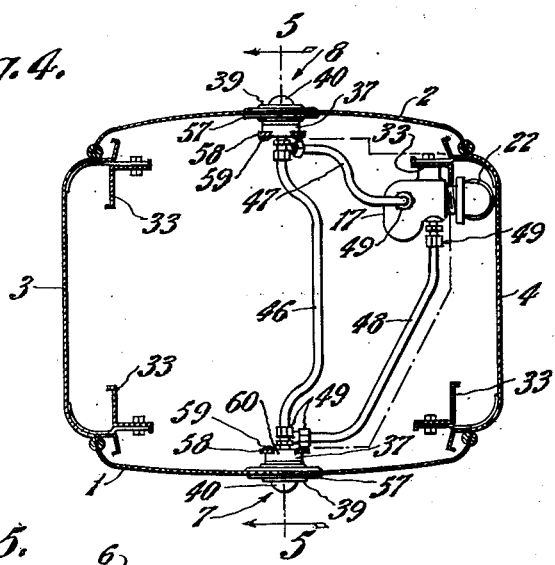
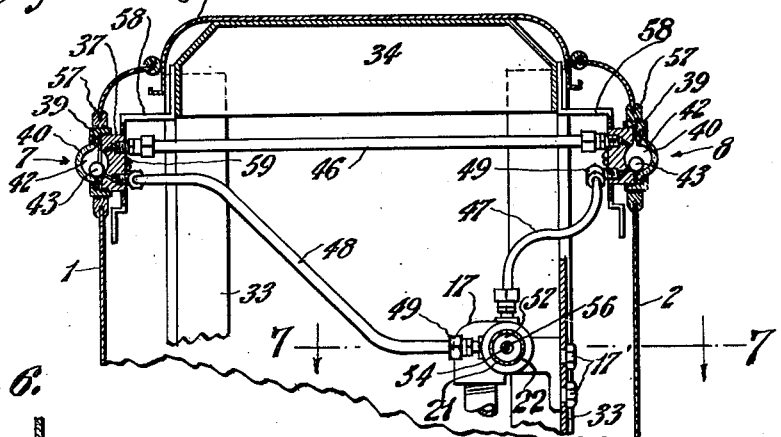
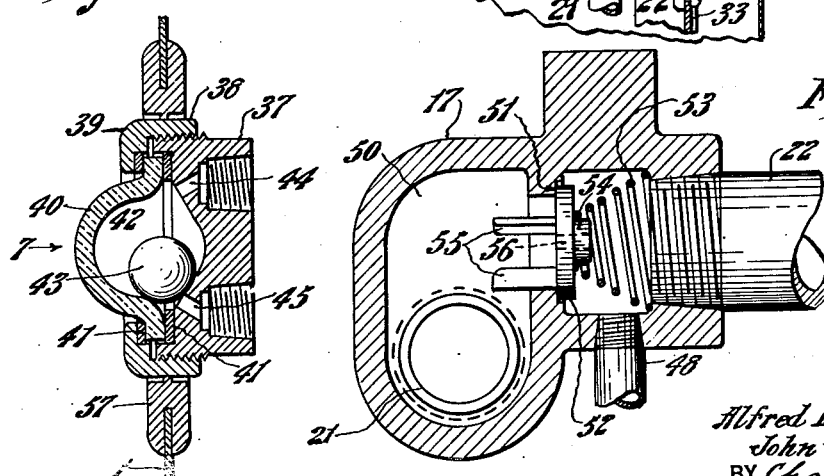
INVENTORS,
Alfred L. Grisé and
John J. Pacey,
BY Chapin & Neal
ATTORNEYS Patented May 18, 1954

2,678,624

UNITED STATES PATENT OFFICE 2,678,624

FLOW INDICATING MEANS FOR LIQUID DISPENSING APPARATUS

Alfred L. Grisé and John J. Pacey, Springfield, Mass., assignors to Gilbert & Barker Manufacturing Company, West Springfield, Mass., a corporation of Massachusetts Application September 25, 1952, Serial No. 311,352

4 Claims. (Cl. 116—117)

This invention relates to improvements in liquid dispensing apparatus and, more particularly, to improved means for circulating liquid through one or more of the indicators, which are usually employed in such apparatus to indicate whether or not liquid is flowing in the dispensing conduit.

While the improvements are capable of general application, they find one advantageous use in connection with apparatus of the type commonly used at service stations for dispensing measured quantities of gasoline or the like to the fuel tanks of automotive vehicles.

It has been common practice heretofore to force all of the liquid dispensed through the flow indicators, usually two, which are mounted on opposite sides of the housing of the apparatus. This practice necessarily results in the use of flow indicators, which are relatively of large bulk, and of connecting conduits, which are as large in size as other parts of the dispensing conduit, in order to permit the high rates of flow customarily used, say for example, 18 gallons per minute. The parts are not only large and occupy considerable space but they are also expensive to make.

This invention has for an object the provision of means for by-passing a small portion only of the liquid flowing through the dispensing conduit through the flow indicator or indicators of the apparatus, whereby the indicators may be made very much smaller and more attractive in appearance, and the conduits of the by-pass may be small tubes instead of the large conduits formerly employed.

The invention has for another object the provision of a check valve in the dispensing conduit opening only by the flow therethrough and a by-pass including a flow indicator and having its inlet and outlet respectively connected to the conduit on the upstream and downstream sides of said valve, said check valve being held open by the liquid flowing through the dispensing conduit and effecting a pressure drop to insure flow of liquid through the by-pass and the flow indicator, especially at relatively low rates of flow in the dispensing conduit.

The invention has for another object the provision in apparatus of the class described, of a small orifice through the check valve in the dispensing conduit for the purpose of enabling quick equalization of the pressure on opposite sides of such valve, when the flow control valve in the nozzle of dispensing conduit is closed, and prevent the creation of pulsations or vibrations, which might otherwise occur and which might be transmitted to the flow indicator, causing movement of the movable element thereof at times, when no liquid is flowing in the dispensing conduit.

The invention will be disclosed with reference to the one illustrative embodiment of it shown in the accompanying drawings, in which, Figs. 1 and 2 are small scale exterior front and side elevational views, respectively, of a gasoline measuring and dispensing apparatus embodying the invention;

Fig. 3 is a sectional elevational view of the apparatus, taken on the line 3—3 of Fig. 2, drawn to a larger scale, and showing the interior mechanism;

Fig. 4 is a sectional plan view taken on the line 4—4 of Fig. 1, showing the flow indicators and the by-pass conduits connecting them to the dispensing conduit of the apparatus;

Fig. 5 is a fragmentary cross sectional view taken on the line 5—5 of Fig. 4;

Fig. 6 is a full size cross sectional view of one of the flow indicators; and

Fig. 7 is a sectional plan view taken on the line 7—7 of Fig. 5.

Referring to these drawings, there is shown in Figs. 1 and 2 a gasoline measuring and dispensing apparatus, in which the invention may be embodied. This particular apparatus has a housing made up of upstanding front and rear walls 1 and 2, upstanding side walls 3 and 4, a base 5 from which walls 1, 2, 3 and 4 upstand, and a cap 6, connecting the upper ends of the front and side walls, the whole forming an enclosure for the pumping and metering mechanism. The flow indicators are shown at 7 and 8, as respectively protruding through the front wall 1 and rear wall 2 of the housing and in each case the indicator is located just above the opening, such as 9, through which the dial 10 of the register is visible. Within this housing (Fig. 3) is a pump 11, which is of the usual form having a relief valve controlled by-pass interconnecting the outlet and inlet sides thereof and which may be driven as indicated by an electric motor 12. The pump draws up gasoline from a low-level supply tank (not shown) through a suction pipe, shown in part at 13, and forces the liquid through a dispensing conduit. This conduit has interposed therein a suitable air separator 14, a suitable meter 15, a check valve 16, and a second valve 17, which is related to the flow indicators 7 and 8 as will later appear. This conduit, as shown, includes a section 18 connecting the outlet of the pump 11 to the inlet of the separator 14, a section 19 connecting the outlet of the separator 14 to the inlet of meter 15, a section 20 connecting the outlet of the meter 15 to the inlet of check valve 16, a section 21 connecting the outlet of valve 16 to the inlet of valve 17, a section 22 connecting the outlet of valve 17 to the inlet of a flexible hose 23, and the hose 23.

On the terminal end of the hose is a nozzle 24 of the usual well known kind having a normally closed valve adapted to be manually opened and held open during dispensing by a lever 24' (indicated in Fig. 1). The hose 23, in this case, is arranged in two loops, one of which is normally located within the housing and the other of which is located outside the housing closely adjacent side wall 4 thereof. The nozzle 24 is suitably hung up on wall 4, as indicated. Adjacent the nozzle is a hand lever 25, which through suitable connections 26, indicated in Fig. 3, actuates the switch 27 of motor 12. The meter 15 drives by a shaft 28 a suitable register 29, which indicates through openings in its dial 10, the quantity and/or cost of the liquid dispensed. The crank 30, adjacent side wall 3, is for resetting the register through a shaft 31. The pump 11 and motor 12 are respectively mounted on the lower and upper faces of a table 32, fixed at its corners to four corner posts 33, which upstand from base 5 and are interconnected at their upper ends by an inner cap 34 on which the described cap 6 is mounted. These various housing walls are suitably attached to the corner posts, as indicated. The meter 15 and register 29 are respectively fixed to tables 35 and 36, both of which are fixed to the corner posts 33.

The particular apparatus described will serve as an illustrative example of one dispensing apparatus, in which the invention may be embodied. The details of this apparatus are not essential to the present invention, which relates to means for by-passing a small part of the liquid that flows in the dispensing conduit through one or more flow indicators in a manner to secure proper and effective operation of the movable element of each indicator at all times.

The flow indicators 7 and 8 are alike in construction and therefore a description of one will suffice for both. Referring more particularly to Fig. 6, the indicator 7 comprises a body 37 of short cylindrical form, screw-threaded near its outer end to receive the interiorly-threaded hollow-cylindrical extension 38 of an annular clamping ring 39, by means of which the flat annular rim of a window 40 is clamped, with gaskets 41 on opposite sides thereof, against the flat annular part of the outer end face of the body 37. The window, which is made of thick glass, has its central portion protruding outwardly through the opening in the clamping ring 39 and this portion is of approximately hemispherical shape, affording within it a recess which, together with the recess formed by the inwardly-dished confronting part of the outer end face of the body 37, affords a chamber 42 to receive a ball 43. This ball is a solid one made of a suitable plastic material which may be colored during the molding thereof and which is of light weight so as to be readily movable by flow of liquid in the chamber 42. Also, the ball, when moved around in this chamber is substantially noiseless. The ball gravitates to the illustrated position, when there is no flow through the dispensing conduit. The body 37 has upper and lower passages 44 and 45, respectively communicating at their inner ends with the upper and lower parts of the chamber 42 and being threaded at their outer ends to receive suitable liquid conducting conduits.

The passages 44 of the indicators 7 and 8 are interconnected together by a tube 46 (Fig. 5). The passage 45 of indicator 8 is connected by a tube 47 to the valve casing 17 in the dispensing conduit at one location and the passage 45 of indicator 7 is connected by a tube 48 to the casing 17 at another location which as shown in Fig. 3 is downstream from the first location. The ends of these tubes are connected to the various casings by means of compression couplings 49 of well known forms. Liquid flows through tube 47 into the lower part of chamber 42 of indicator 8, thence upwardly in such chamber, leaving from the upper end thereof and flowing into and through tube 46 and then into the upper end of the chamber 42 of indicator 7, thence downwardly through the last-named chamber to the lower end thereof, from which it flows into tube 48 and through the latter back into the valve casing 17. It will be clear that the ball 43 will be moved by the flow of liquid through chamber 42, whether the flow is upward as in indicator 8 or downward as in indicator 7. In either case, the ball 43 will move around in its chamber, when there is flow therethrough, and movement of the ball may be observed through the window 40, particularly if the ball is brightly colored.

The casing 17, as will be clear from Fig. 7, contains a passage 50 for interconnecting the pipe sections 21 and 22 of the dispensing conduit. Intermediate the ends of this passage is an annular seat 51 against which a disk valve 52 is yieldingly held by means of a conical coil spring 53, the outer and larger end of which is seated against a shoulder at the outer end of passage 50 and the inner and smaller end of which encompasses a boss 54 on the outer face of valve disk 52 and seats on such face. Projections 55 from the inner face of valve disk 52 slidably engage a wall of passage 50 and guide the valve in its movements to and from its seat 51. There is a small hole 56 drilled through disk 52 and its boss 54 for a purpose to be later described. The valve casing 17 is secured by cap screws 17' to one of the corner posts 33 as shown in Fig. 5.

It will be seen from Fig. 4 that the tubes 47 and 48 communicate with passage 50 on opposite sides of valve 52, the inlet tube 47 communicating with the upstream part thereof and the outlet passage 48 with the downstream part thereof. The valve 52 (Fig. 7) will be moved away from its seat 51 against the force of spring 53 and held in this open position, by flow of liquid through the dispensing conduit. The small hole 56 could not, of course, pass but a small fraction of the dispensing flow. The purpose of the valve 52 is to create a drop in pressure between the inlet and outlet ends of the by-pass tubes 47 and 48 sufficient to cause flow of liquid through the by-pass tubes 47, 46 and 48 in the manner described. In dispensing apparatus of the class described, the rate of flow through the dispensing conduit and its nozzle 24 has to be varied according to conditions encountered. The maximum rate of flow, of say 18 gallons per minute, cannot be used when filling the tanks of some automobiles. And in almost every tank filling operation it is usual to throttle down the flow, by allowing the nozzle valve to partially close, near the end of the filling operation. The valve 52 insures the diversion of a small part of the flow through the flow indicators at any of the low rates of dispensing flow that may be used.

The purpose of the hole 56 in valve 52 is to prevent the creation of forces, when the nozzle valve is closed, that might act to continue the ball 43 in motion. It is usual to close the valve in nozzle 24 before the pump motor 12 is stopped. Liquid continues to be pumped, after the valve in nozzle 24 closes, through the usual by-pass provided in the pump 11 and, while the pressure in the dispensing conduit is greatly reduced by the opening of this by-pass, following closure of the nozzle valve, there will nevertheless be some force exerted on the check valve 52 tending to open it after it has been closed by spring 53. Unless the hole 56 is provided in the valve 52 the latter will tend to move back and forth from its seat for awhile, setting up a vibration, which is transmitted to the chambers 42 and causes movement of the balls 43. Movement of the balls may occur from this cause, when there is no flow whatever from the nozzle 24, thus giving a false indication. The hole 56 enables equalization of pressure on opposite sides of the valve 52, when the latter seats, and prevents the setting up of vibrations such as will move the balls 43.

The flow indicators 7 and 8 may be mounted in the pump housing in any suitable way. It is preferred to rigidly fasten the casing of each indicator to the inner frame of the housing and allow the ring 39 thereof to extend outwardly through the opening in a gasket 57 which is suitably fixed in the housing wall 1 or 2, as the case may be, as will be clear from Figs. 5 and 6. A bracket 58 (Figs. 3, 4 and 5), fixed to the inner cap 34, extends downwardly in back of the body 37 and the latter is clamped to the bracket by screws 59 (Figs. 3 and 4). Preferably, the bracket has a rectangular opening therethrough (shown in Fig. 3), to receive and closely fit a correspondingly-shaped projection 60 from the inner face of the body 37, whereby the body will be held in the desired angular position.

The invention provides for the diversion of a small fraction of the flow through the dispensing conduit through a by-pass comprising the tubes 47, 46 and 48 and the chambers of one or more flow indicators located in series relation so that the by-passed liquid flows successively through the chamber and directly actuates the movable elements therein. The arrangement enables the flow indicators to be made much smaller than was possible heretofore. Each indicator, herein illustrated, has a window diameter which is only one third that of the window of the flow indicator usually used heretofore. The indicators are more attractive in appearance and much less expensive to make. The tubes, which form the by-pass, may be copper tubes of small diameter readily bent into the desired form. They occupy less space within the housing and cost less than the heavier piping formerly used. The circulation through the described by-pass, which includes the flow indicators, is insured particularly at the lower rates of flow in the dispensing conduit, by the check valve 52 which produces a pressure differential such as to cause liquid to enter tube 47, flow through the by-pass and indicators and leave by the tube 48 emptying back into the dispensing conduit. Flow through the indicators causes movement of the movable elements therein, such as the balls 43. Movement of these elements, as has been set forth above, could be caused following closure of the valve in nozzle 24, by vibrations set up by chattering of valve 52 but for the provision of the small orifice 56 through the valve. This orifice provides for quick equalization of liquid pressure on opposite sides of the valve and inhibits the chattering of the valve, which might otherwise occur.

The invention thus provides an improved means for circulating a small portion of the flow through a dispensing conduit through a by-pass which includes one or more flow indicators arranged in series relation and each having elements therein intended to be directly moved by the liquid flowing through the by-pass.

What is claimed is:

1. In a liquid dispensing apparatus, having a dispensing conduit adapted for connection at one end to a source of liquid supply, means for forcing liquid through the conduit, and a nozzle on the other end of the conduit having a valve to control the rate of flow of the liquid dispensed; a flow indicator including a casing having a chamber and an inlet and outlet therefor, an element in said chamber adapted to be moved by flow of liquid therethrough, and a window in said casing through which movement of said element may be observed; a check valve in the dispensing conduit opening by and in the direction of the flow of liquid therethrough, and other conduits relatively small compared to the dispensing conduit for respectively connecting the dispensing conduit on the upstream and downstream sides of said check valve to the inlet and outlet of the flow indicator, whereby a fraction of the dispensing flow may be by-passed through the flow indicator to actuate the movable element thereof.

2. In a liquid dispensing apparatus, having a dispensing conduit adapted for connection at one end to a source of liquid supply, means for forcing liquid through the conduit, and a nozzle on the other end of the conduit having a valve to control the rate of flow of the liquid dispensed; a check valve in said conduit opening by and in the direction of the flow of liquid therethrough, a by-pass conduit having its inlet and outlet respectively connected to the dispensing conduit on the upstream and downstream sides of said check valve and adjacent thereto, and a plurality of flow indicators interposed in said by-pass in series relation and each having a chamber with an element therein movable by the flow through the by-pass conduit and a window through which movement of such element may be observed.

3. The combination, as claimed in claim 1, in which the check valve has an orifice therethrough relatively small in cross sectional area as compared to the dispensing conduit for equalizing the pressure on opposite sides of the check valve when the nozzle valve is closed.

4. In a liquid dispensing apparatus, having a dispensing conduit adapted for connection at one end to a source of liquid supply, means for forcing liquid through the conduit, and a nozzle on the other end of the conduit having a valve to control the rate of flow of the liquid dispensed; a by-pass conduit relatively small in cross sectional area as compared to the dispensing conduit and having an inlet connected to the dispensing conduit at one location and an outlet connected to the dispensing conduit at another location spaced downstream from the first location, and a plurality of flow indicators interposed in said by-pass in series relation and each having a chamber with an element therein movable by the flow through the by-pass conduit and a window through which movement of such element may be observed, whereby only a small fraction of the liquid dispensed is passed through the by-pass conduit and said chambers to directly actuate the movable elements in said chambers.

References Cited in the file of this patent

UNITED STATES PATENTS

| Number | Name | Date |
| --- | --- | --- |
| 2,219,677 | Benzin | Oct. 29, 1940 |